United States Patent
Kuehn et al.

(10) Patent No.: US 7,206,180 B2
(45) Date of Patent: Apr. 17, 2007

(54) METHOD FOR REGULATING THE CURRENT THROUGH AN ELECTROMAGNETIC ACTUATOR

(75) Inventors: Willi Kuehn, Markgroeningen (DE); Ewald Stuible, Eberdingen (DE); Rupert Fackler, Pleidelsheim (DE); Christian Klein, Oberriexingen (DE); Bernd Gussmann, Herrenberg (DE); Christian Schwientek, Neckarsulm (DE); Ingo Mueller-Vogt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/527,291

(22) PCT Filed: Jun. 10, 2003

(86) PCT No.: PCT/DE03/01904

§ 371 (c)(1),
(2), (4) Date: Nov. 14, 2005

(87) PCT Pub. No.: WO2004/027529

PCT Pub. Date: Apr. 1, 2004

(65) Prior Publication Data

US 2006/0098377 A1 May 11, 2006

(30) Foreign Application Priority Data

Sep. 14, 2002 (DE) .................................. 102 42 790

(51) Int. Cl.
*H01H 47/00* (2006.01)
*H01H 47/28* (2006.01)
*H01H 47/32* (2006.01)

(52) U.S. Cl. ..................................... 361/152; 361/153

(58) Field of Classification Search ................ 361/152, 361/153

See application file for complete search history.

(56) References Cited

U.S. PATENT DOCUMENTS

| 5,432,693 | A | * | 7/1995 | Anderson | .................... 363/41 |
| 5,914,850 | A | * | 6/1999 | Johansson | ................... 361/187 |
| 5,924,703 | A | | 7/1999 | Ichimaru | |
| 6,687,555 | B1 | * | 2/2004 | Honda et al. | ................. 700/73 |

FOREIGN PATENT DOCUMENTS

DE           199 41 488         3/2001

* cited by examiner

*Primary Examiner*—Stephen W. Jackson
*Assistant Examiner*—Dharti H. Patel
(74) *Attorney, Agent, or Firm*—Kenyon & Kenyon LLP

(57) ABSTRACT

A method for regulating the current through an electromagnetic actuator. The actuator, a first switch and a current-measuring circuit form a series circuit. A free-wheeling diode is parallel-connected to the actuator. The first switch is closed and opened by a control and a pulse generator using a PWM signal (PWM=pulse width modulation) in such a way that the current flowing through the actuator and measured by the current-measuring circuit is regulated to a setpoint value (SW). The time duration of one on and off switching cycle of the PWM signal is altered, and a so-called dither function in the form of a low-frequency oscillation is superimposed on the PWM signal.

8 Claims, 3 Drawing Sheets

METHOD FOR REGULATING THE CURRENT THROUGH AN ELECTROMAGNETIC ACTUATOR

FIELD OF THE INVENTION

The present invention relates to a method for regulating the current through an electromagnetic actuator, in which the actuator, a first switch and a current-measuring circuit form a series circuit, a free-wheeling diode being parallel-connected to the actuator (10), and the first switch being opened and closed by a control and a pulse generator with the aid of a PWM signal (PWM=pulse-width modulation) in such a way that the current flowing through the actuator and measured by the current-measuring circuit is regulated to a setpoint value.

BACKGROUND INFORMATION

A method of this kind is generally conventional. In the electrical circuit underlying the method, the PWM signal is converted with the aid of the first switch into a current across the actuator. The current flowing across the actuator is measured by the current-measuring circuit in the closed and in the open state of the first switch. The comparison to the predefined setpoint value necessary for regulating this current is carried out on this basis.

A problem with the conventional control is that the electromagnetic actuator usually has a hysteresis. The result is that, for example, when the actuator is used for a transmission control of a motor vehicle, exact shifting operations of the transmission are no longer able to be easily carried out because of inaccuracies of the control resulting from the hysteresis.

SUMMARY

An object of the present invention is to provide a method for regulating the current through an electromagnetic actuator, which permits higher accuracy of control.

This objective may be achieved according to the present invention by altering the time duration of an on and off switching cycle of the PWM signal, and superimposing a so-called dither function in the form of a low-frequency oscillation on the PWM signal.

The change in the time duration of an on and off switching cycle represents a change in the so-called chopper frequency of the PWM signal. Such a change in the chopper frequency makes it possible to reduce a so-called seating bounce of the electromagnetic actuator. It is likewise possible to reduce the hysteresis of the actuator, particularly in the middle current range, by decreasing the chopper frequency. The chopper frequency may be selected as a function of temperature, so that the frictional hysteresis of the actuator is reduced by a drop in the chopper frequency. All in all, the control, according to the present invention, of the current through the actuator can be substantially improved by the influencing of the time duration of the on and off switching cycle of the PWM signal.

This control is further improved by the dither function. In particular, with the aid of the low-frequency oscillation of the PWM signal, the movable iron core of the actuator is prevented from going over to a state of static friction. Thus, the iron core may be kept continually in a state of sliding friction by the dither function, resulting in minimum hysteresis of the actuator.

It may be particularly advantageous if in the case of the dither function, a dither value is added to or subtracted from each pulse of the PWM signal. The time duration during which the dither value is added to the pulses of the PWM signal is preferably equal to the time duration during which the dither value is subtracted from the pulses.

This brings with it the advantage that the dither function all in all has no influence on the average current which flows through the actuator.

In one particularly advantageous further development of the present invention, the two time durations yield a total time duration that is a multiple of the time duration of one on and off switching cycle of the PWM signal.

In another especially advantageous development of the present invention, the current flowing through the actuator and measured by the current-measuring circuit is freed from the dither function by a corrector. In this case, it is particularly advantageous if two current values are measured in the time interval of the time duration during which the dither value is added to or subtracted from the pulses of the PWM signal, and that an average value of these two measured current values is formed.

The averaging of the two current values measured in the indicated time interval ensures that the added and subtracted dither values precisely cancel each other out. In this way, the dither function has no influence whatsoever on the regulation of the current through the actuator.

In one advantageous embodiment of the present invention, the current through the actuator is ascertained by a diagnostic from the measured moments the first switch is switched on and off, and this ascertained current is compared by the diagnostic to the current measured by the current-measuring circuit and/or to the setpoint value.

According to the present invention, this permits a redundant check of the overall regulation of the current through the actuator. Thus, it is not only possible to compare the measured current to the setpoint value, in addition, the current ascertained from the on and off switching moments may also be compared to the measured current and/or to the setpoint value. There is therefore the possibility of being able to react better to short circuits and current variations caused by malfunctions.

The present invention may also be realized in the form of a computer program or in the form of a control unit. The computer program may then be stored in an electronic storage medium. The control unit may in particular include those components of the invention which are realized in software. Moreover, the control unit may have all those components which are necessary for coupling the software to the actuator and to the associated hardware components.

BRIEF DESCRIPTION OF THE DRAWINGS

Further features, uses and advantages of the present invention come to light from the following description of exemplary embodiments of the present invention which are shown in the figures. In this context, all of the features described or illustrated form the subject matter of the present invention, alone or in any desired combination, independently of their formulation or illustration in the description and in the figures.

DETAILED DESCRIPTION OF EXAMPLE EMBODIMENTS

Figure 1:
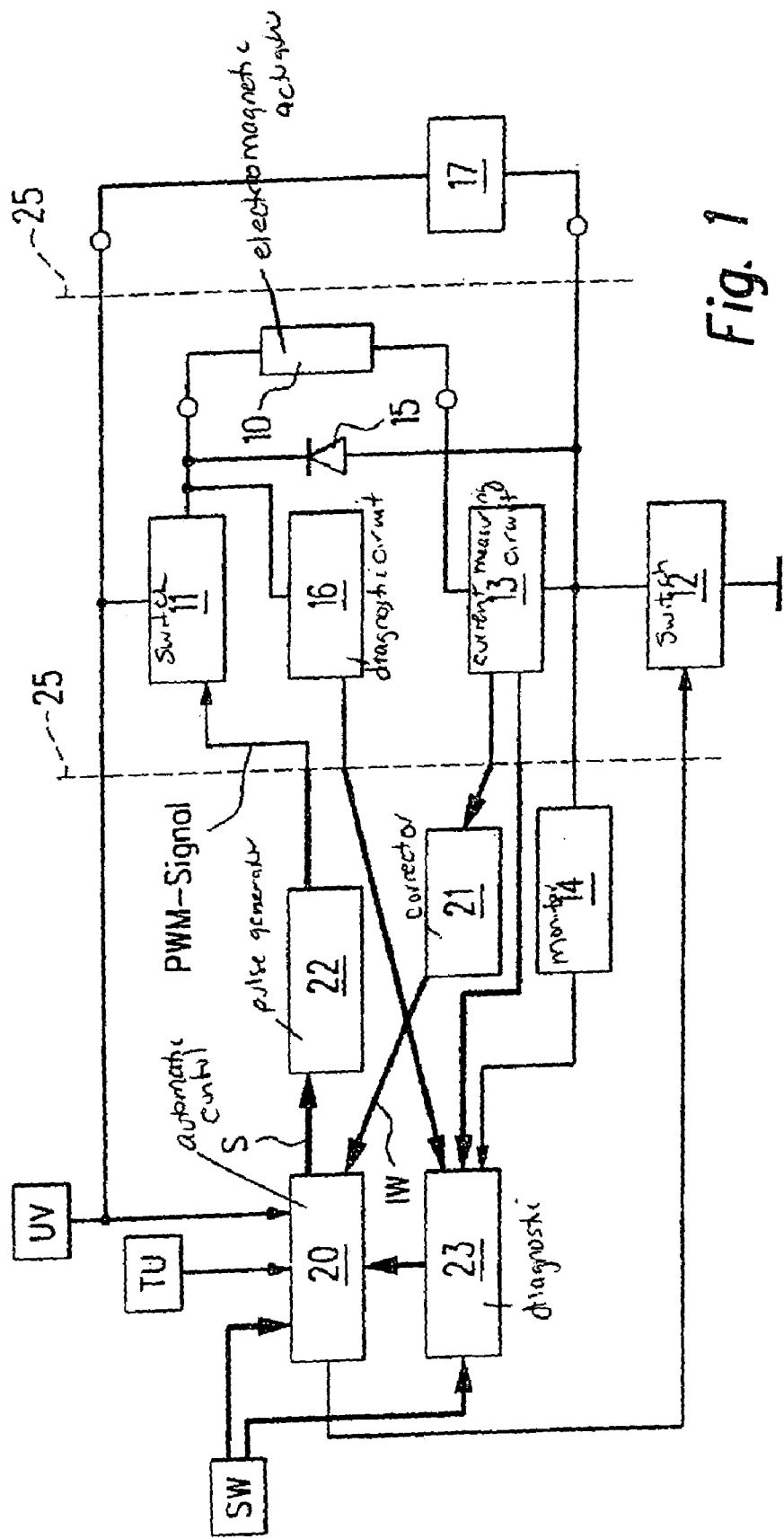
FIG. 1 shows a schematic block diagram of an exemplary embodiment of a system according to the present invention for regulating the current through an electromagnetic actuator.

FIG. 1 shows an electromagnetic actuator 10 which, for example, may be a coil having an iron core displaceably situated therein. Actuator 10 may be used, for example, for a transmission control of a motor vehicle or as an injection valve of an internal combustion engine or the like.

Actuator 10 is connected via a first switch 11 to a supply voltage UV and via a second switch 12 to ground. A current-measuring circuit 13 is interconnected between actuator 10 and second switch 12, and a monitor 14 is connected.

A free-wheeling diode 15 is connected in parallel to actuator 10 and current-measuring circuit 13.

A diagnostic circuit 16 is connected to the connection point of actuator 10 and first switch 11. The connection point of current-measuring circuit 13 and monitor 14 is connected via a resistor 17 to supply voltage UV.

An automatic control 20 receives supply voltage UV, a signal representing ambient temperature TU and a signal characterizing a setpoint value SW. A signal generated by current-measuring circuit 13 is processed by a corrector 21, to then be relayed to control 20. Control 20 triggers first switch 11 via a pulse generator 22 on one hand, and triggers second switch 12 directly on the other hand.

A diagnostic 23 receives signals generated by diagnostic circuit 16, current-measuring circuit 13 and monitor 14. Setpoint value SW is also applied to diagnostic 23. As a function thereof, diagnostic 23 is able to act upon control 20.

Only one actuator 10 is shown in FIG. 1. The system described is suitable for regulating the current through this actuator 10. However, it is also possible for there to be a plurality of actuators 10. In this case, a corresponding plurality of those components situated in FIG. 1 between the two dotted lines 25 are provided. Thus, in this case, not only a plurality of actuators 10 are present, but also a plurality of associated first switches 11, current-measuring circuits 13, free-wheeling diodes 15 and diagnostic circuits 16.

The plurality of actuators 10 are then triggered in parallel to each other in the same manner as shown in FIG. 1 and already described. For this purpose, those connections which are repeatedly present in this case are shown as thicker lines in FIG. 1. For example, these connections may be bus connections in which a single line of the bus connection is allocated to each control valve actuator 10.

The components shown between the two lines 25 are implemented as hardware components. The components shown left of lines 25 in FIG. 1 are preferably implemented as software and are provided for execution by a microprocessor or the like. For this purpose, a computer program is provided whose program commands are capable of being executed on the microprocessor. The computer program is preferably stored in a flash memory which, together with the microprocessor, is accommodated in a control unit. Interfaces, analog/digital converters and the like, which are not shown in FIG. 1, may be present between the hardware components and the microprocessor, i.e., the control unit.

Figure 2:
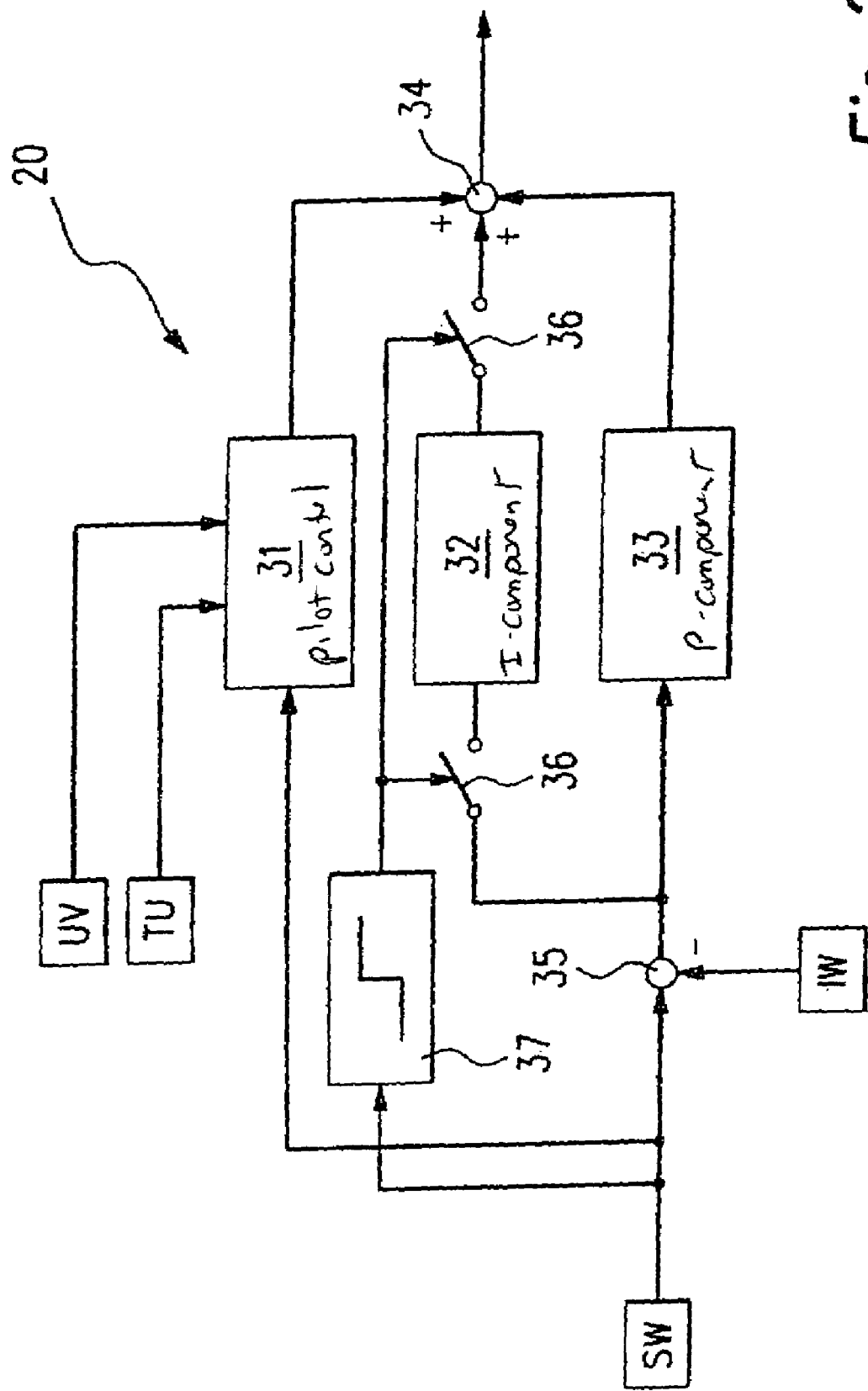
FIG. 2 shows a schematic block diagram of an exemplary embodiment of an automatic control for the system of FIG. 1.

Control 20 of FIG. 1 is shown in greater detail in FIG. 2. Control 20 has a pilot control 31, an I-component 32 and a P-component 33.

Pilot control 31 receives supply voltage UV, ambient temperature TU and setpoint value SW. As a function thereof, pilot control 31 generates a signal that is fed to a summing point 34. Pilot control 31 has the task of keeping as small as possible the deviation to be equalized by I-component 32 and P-component 33.

An actual value IW is subtracted from setpoint value SW at a subtraction point 35. Actual value IW corresponds to the signal generated by corrector 21 in FIG. 1. The difference ascertained by subtraction point 35 is applied to I-component 32 and P-component 33. P-component 33 generates a signal that is supplied to addition point 34.

The generation of I-component 32 may be interrupted with the aid of two switches 36. To this end, both switches 36 are triggered by a block 37 which, on its part, is acted upon by setpoint value SW.

By a continual comparison of the successive values in time, block 37 recognizes whether setpoint value SW realizes a sudden change that exceeds a predefined maximum sudden change. If this is the case, block 37 opens both switches 36 and interrupts the generation of I-component 32. The sudden change of setpoint value SW is then compensated solely by P-component 33. The duration of the interruption of I-component 32 may be permanently predefined or variably selected, for example as a function of the magnitude of the change in setpoint value SW.

If block 37 detects no sudden change, then switches 36 remain closed and I-component 32 is active. I-component 32 is then supplied to addition point 34. Here it should be pointed out once again that control 20 of FIG. 2, and therefore switches 36, as well, are preferably implemented as software.

Sum S generated by addition point 34 corresponds to the signal generated by control 20 and supplied to pulse generator 22.

The system shown in FIG. 1 for regulating the current through actuator(s) 10 functions as follows:

The current across actuator 10 is adjusted with the aid of first switch 11. For this purpose, first switch 11 receives a PWM signal (PWM=pulse width modulation). Second switch 12 is closed during normal operation.

Figure 3:
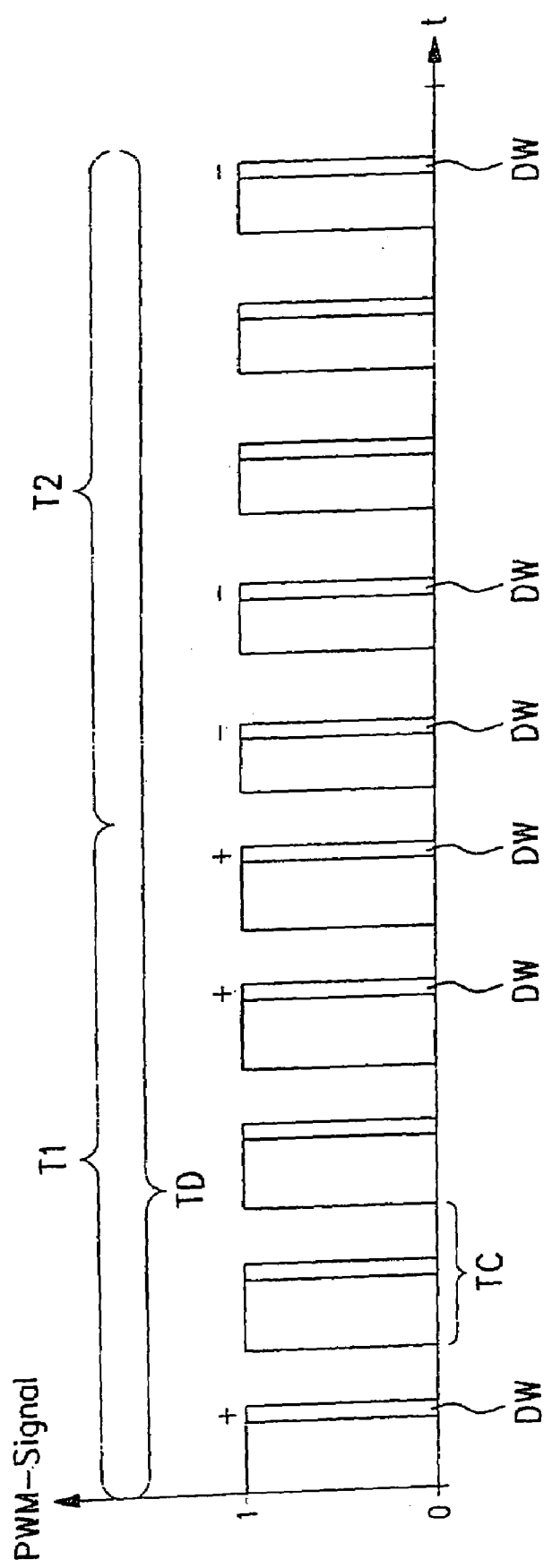
FIG. 3 shows a schematic timing diagram of the triggering signal for the current through the electromagnetic actuator.

Such a PWM signal is plotted over time t by way of example in FIG. 3. The PWM signal distinguishes only between a switched-on state ("1"), in which first switch 11 is closed, and a switched-off state ("0"), in which first switch 11 is open. When first switch 11 is closed, a current flows from voltage supply UV across first switch 11, actuator 10, current-measuring circuit 13 and closed second switch 12 to ground. No such current flows when first switch 11 is open. Thus, it is possible to influence the current flowing through actuator 10 by varying the time durations the PWM signal is switched on and off.

The PWM signal is generated by pulse generator 22 as a function of the output signal of control 20. In particular, pulse generator 22 converts the output signal of control 20 into a PWM signal whose relationship of the on and off switching durations corresponds to the magnitude of the output signal.

Time duration TC of one on and off switching cycle of the PWM signal corresponds to the so-called chopper frequency of the PWM signal. Control 20 and/or pulse generator 22 are able to variably alter this time duration TC. If a plurality of actuators 10 are provided, their time durations TC may be variably altered, independently of one another.

To ensure that, to the greatest extent possible, the moments first switches 11 belonging to the different actuators 10 are switched on and/or off do not occur simultaneously, the individual actuators 10 are triggered in phase-shifted manner. By varying time durations TC, this phase relationship may be influenced in such a way that as few switching edges as possible fall on one another.

The alteration of time durations TC and therefore of the chopper frequency may also be used to achieve a reduction in the so-called seating bounce of actuator 10 by a smaller travel amplitude of the displaceable iron core at a greater chopper frequency. In particular, the hysteresis of actuator 10 may be reduced in a medium current range by a lower chopper frequency. The chopper frequency may be adjusted as a function of temperature in such a way that the chopper frequency is reduced at lower temperatures, so that a friction hysteresis of actuator 10 existent at lower temperatures is reduced.

Control 20 and/or pulse generator 22 are able to perform a so-called dither function which involves a low-frequency oscillation superimposition for the current through actuator 10. In this context, a specifiable dither value DW is added to or subtracted from the PWM signal ascertained per se. This dither function may be implemented for a plurality of actuators 10 independently of each other and in variable fashion.

This is shown for a single actuator 10 in FIG. 3, in that the individual pulses of the PWM signal are first extended by dither value DW and thereupon shortened. Time duration T1 in which the individual pulses are extended is equal to time duration T2 in which the pulses are shortened. Total time duration TD of the dither function resulting additively from the two above-named time durations T1, T2 is a multiple of time duration TC of the chopper frequency. In the present case, time duration TD is ten-fold that of time duration TC.

Additionally, by altering the temporal length of dither value DW, it is also possible to vary the amplitude of the dither function.

In particular, the dither function makes it possible to prevent the movable iron core of driven actuator 10 from going into a state of static friction. Thus, the iron core may be kept continually in a state of sliding friction by the dither function, resulting in minimal hysteresis of actuator 10.

Control 20 is triggered at predefined time intervals and carried out in accordance with the number of existing actuators 10. Corresponding output signals are transmitted for all existing actuators 10 from control 20 to pulse generator 22, which then continually generates the respective associated PWM signals for the various actuators 10, by which respective first switches 11 belonging to the various actuators 10 are ultimately driven.

The current flowing in this manner across the various actuators 10 is measured by respective associated current-measuring circuit 13. The current-measuring circuit may preferably be a so-called shunt resistor. The measured current value is relayed to corrector 21 where the dither function, introduced by control 20 and pulse generator 22, respectively, is calculated out again. The result is that the dither function has no influence whatsoever on control 20.

Compensation may be made for the dither function in corrector 21, for example, by forming the average value from two current values measured in the time interval of time duration T1. Because of the correlation between time duration TD of the dither function and time duration TC of the chopper frequency, the dither function, and particularly dither value DW is no longer contained in the aforesaid average value.

As already explained, the measured current value freed of the dither function is forwarded by corrector 21 as actual value IW to control 20.

The measured current value is also forwarded by current-measuring circuit 13 to diagnostic 23. There, the measured current value is compared to setpoint value SW. In the event of a deviation exceeding a specifiable maximum value, diagnostic 23 is able either to intervene in a correcting manner via control 20, or to switch off the current through actuator 10 in question or indeed for all existing actuators 10.

The potential existing between actuator(s) 10 and second switch 12 is monitored by monitor 14 and forwarded to diagnostic 23. If this potential is faulty, in particular if there is a short circuit to supply voltage UV, then second switch 12 is immediately opened by diagnostic 23 via control 20, so that no current is able to flow any longer across actuator(s) 10.

The potential existing between actuator(s) 10 and first switch 11 is monitored by diagnostic circuit 16 and forwarded to diagnostic 23. If this potential is faulty, in particular if there is a short circuit to ground, then first switch 11 is permanently opened immediately by diagnostic 23 via control 20, so that no current is able to flow any longer across actuator(s) 10.

Moreover, diagnostic circuit 16 detects those moments at which first switch(es) 11 is/are opened and closed. From these measured moments, diagnostic 23 is able to ascertain the specific value of the current flowing through appertaining actuator 10. This ascertained current value is compared to the current value measured by current-measuring circuit 13 and/or to setpoint value SW. If diagnostic 23 determines a deviation greater than a predefined maximum value, then in turn the current through appertaining actuator 10 or through all existing actuators 10 may be switched off via control 20.

Overall, therefore, in this way the current flowing through actuator 10 is monitored repeatedly and thus redundantly. This holds true for a plurality of existing actuators 10 as well.

Prior to the first operation of the system shown in FIG. 1 for regulating the current through actuator(s) 10, thus in particular during an initialization of the system, second switch 12 is still open, so that no current flows across actuator(s) 10. The potential between actuator(s) 10 and second switch 12 can therefore not be ascertained per se.

However, this is made possible with the aid of resistor 17. Resistor 17 is present only once and has a more likely large resistance value. Because of resistor 17, the potential between actuator(s) 10 and second switch 12 may be ascertained by monitor 14, and it is therefore possible to determine a short circuit to supply voltage UV or to ground.

Diverting from FIG. 1, it is alternatively possible for the second switch to receive the PWM signal, and for the first switch to continually remain closed during normal operation. In this case, the diagnostic circuit is assigned to the second switch, and the monitor is assigned to the first switch. Apart from that, however, the variable chopper frequency and the dither function are applicable in the same way as described in FIG. 1.

What is claimed is:
1. A method for regulating current through an electromagnetic actuator, the electromagnetic actuator, a first switch and a current-measuring circuit forming a series circuit, a free-wheeling diode being parallel-connected to the electromagnetic actuator, the method comprising:
closing and opening the first switch by an automatic control and a pulse generator using a pulse width modulation signal (PWM) in such a way that current flowing through the electromagnetic actuator and measured by the current-measuring circuit is regulated to a setpoint value;

altering a time duration of one on and off switching cycle of the PWM signal; and superimposing a dither function in a form of a low-frequency oscillation on the PWM signal, wherein for the dither function, a dither value is added to or subtracted from each pulse of the PWM signal, wherein a time duration during which the dither value is added to the pulses of the PWM signal is equal to a time duration during which the dither value is subtracted from the pulses, and wherein the time duration during which the dither value is added to the pulses and the time duration during which the dither value is subtracted from the pulses yield a total time duration which is a multiple of the time duration of one on and off switching cycle of the PWM signal.

2. A method for regulating current through an electromagnetic actuator, the electromagnetic actuator, a first switch and a current-measuring circuit forming a series circuit, a free-wheeling diode being parallel-connected to the electromagnetic actuator, the method comprising:

closing and opening the first switch by an automatic control and a pulse generator using a pulse width modulation signal (PWM) in such a way that current flowing through the electromagnetic actuator and measured by the current-measuring circuit is regulated to a setpoint value;

altering a time duration of one on and off switching cycle of the PWM signal; and superimposing a dither function in a form of a low-frequency oscillation on the PWM signal, wherein the current flowing through the electromagnetic actuator and measured by the current-measuring circuit is freed from the dither function by a corrector.

3. The method as recited in claims 2, further comprising:

measuring two current values in a time interval of the time duration during which the dither value is added to or subtracted from the pulses of the PWM signal; and forming an average value of the two measured current values.

4. The method as recited in claim 1, further comprising:

ascertaining, by a diagnostic, the current through the actuator from measured moments the first switch is switched on and off; and comparing, by the diagnostic, the ascertained current to at least one of the current measured by the current-measuring circuit, and the setpoint value.

5. A memory device storing a computer program, the computer program when executed on a computer, causing the computer to perform the following:

closing and opening a first switch by an automatic control and a pulse generator using a pulse width modulation signal (PWM) in such a way that current flowing through an actuator and measured by a current-measuring circuit is regulated to a setpoint value;

altering a time duration of one on and off switching cycle of the PWM signal; and superimposing a dither function in a form of a low-frequency oscillation on the PWM signal, wherein for the dither function, a dither value is added to or subtracted from each pulse of the PWM signal, wherein a time duration during which the dither value is added to the pulse of the PWM signal is equal to a time duration during which the dither value is subtracted from the pulses, and wherein the time duration during which the dither value is added to the pulses and the time duration during which the dither value is subtracted from the pulses yield a total time duration which is a multiple of the time duration of one on and off switching cycle of the PWM signal.

6. The memory device as recited in claim 5, wherein the memory device is a flash memory.

7. A control unit for regulating current through an electromagnetic actuator, the electromagnetic actuator, a first switch and a current-measuring circuit forming a series circuit, a free-wheeling diode being parallel-connected to the electromagnetic actuator, and the control unit, comprising:

an automatic control; and a pulse generator by which the first switch is closed and opened using a pulse width modulation ("PWM") signal in such a way that the current flowing through the electromagnetic actuator and measured by the current-measuring circuit is regulated to a setpoint value;

wherein the control unit is configured to alter a time duration of one on and off switching cycle of the PWM signal and superimpose a dither function in a form of a low-frequency oscillation on the PWM signal, wherein for the dither function, a dither value is added to or subtracted from each pulse of the PWM signal, wherein a time duration during which the dither value is added to the pulse of the PWM signal is equal to a time duration during which the dither value is subtracted from the pulses, and wherein the time duration during which the dither value is added to the pulses and the time duration during which the dither value is subtracted from the pulses yield a total time duration which is a multiple of the time duration of one on and off switching cycle of the PWM signal.

8. The control unit as recited in claim 7, wherein the control unit is configured to provide transmission control in a motor vehicle.

* * * * *